United States Patent [19]

Yoda et al.

[11] Patent Number: 4,576,559
[45] Date of Patent: Mar. 18, 1986

[54] VENTED TIRE MOLDING MOLD

[75] Inventors: Yasutada Yoda; Seisuke Sueyasu; Michihiro Orikawa, all of Higashimurayama; Shoji Futamura, Kawasaki, all of Japan

[73] Assignees: Bridgestone Tire Co. Ltd.; Institute of Technology Precision Electrical Discharge Works, both of Japan

[21] Appl. No.: 748,143

[22] Filed: Jun. 24, 1985

Related U.S. Application Data

[63] Continuation of Ser. No. 566,716, Dec. 29, 1983.

[30] Foreign Application Priority Data

Dec. 29, 1982 [JP] Japan .................................. 57-231912
Dec. 29, 1982 [JP] Japan .................................. 57-231913

[51] Int. Cl.$^4$ ............................................. B29H 5/02
[52] U.S. Cl. ................................. 425/28 R; 425/28 D; 425/812; 249/141
[58] Field of Search ............................ 425/28 D, 28 R

[56] References Cited

U.S. PATENT DOCUMENTS

| 1,880,430 | 10/1932 | Furnas | 425/28 D |
|---|---|---|---|
| 1,898,251 | 2/1933 | Kopp | 425/812 |
| 1,899,258 | 2/1933 | Bush | 425/46 X |
| 1,943,947 | 1/1934 | Bungay | 425/46 |
| 2,296,016 | 9/1942 | Bostwick | 425/28 D |
| 2,581,939 | 1/1952 | Deist et al. | 425/812 |
| 2,722,717 | 11/1955 | Kimes | 425/28 D |
| 2,752,635 | 7/1956 | Miller | 425/812 |
| 2,813,304 | 11/1957 | Hawkinson | 425/20 |
| 3,479,693 | 11/1969 | Cantarutti | 425/46 X |
| 3,562,861 | 2/1971 | Youngblood | 425/55 |
| 3,692,090 | 9/1972 | Brobeck et al. | 425/46 X |
| 3,937,606 | 2/1976 | Morkeng | 425/28 D |
| 4,446,093 | 5/1984 | Mattson | 425/28 R X |

Primary Examiner—J. Howard Flint, Jr.
Attorney, Agent, or Firm—McGlew and Tuttle

[57] ABSTRACT

A tire manufacturing mold comprises a mold body having an inner circumferential surface corresponding to the contour of a tire being molded, and includes at least the tread thereof. The body has a mold attachment for molding recesses of the tire being molded and a joint surface with the inner circumferential surface of the mold body. The mold attachment is detachably fitted to the inner circumferential surface of the mold body.

10 Claims, 11 Drawing Figures

VENTED TIRE MOLDING MOLD

This application is a continuation, of application Ser. No. 566,716, filed Dec. 29, 1983.

BACKGROUND OF THE INVENTION

1. Field of the Invention

This invention relates generally to a tire molding mold, and more particularly to a tire molding mold comprising a mold body having an inner circumferential surface corresponding to the contour of a tire being molded, including the tread thereof, and a mold attachment for molding recesses of the tire being molded, and the manufacturing method of the same wherein the mold body and the mold attachment are manufactured separately and the mold attachment is adapted to be detachably fitted to the inner circumferential surface of the mold body so as to permit the tire tread pattern to be changed without replacing the mold body with a new one.

2. Description of the Prior Art

Figure 1:
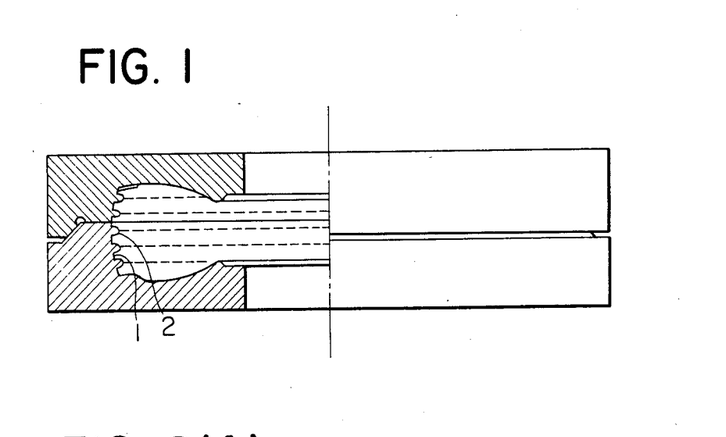
FIG. 1 is a cross sectional view of assistance in explaining a typical example of a tire molding mold.

In general, a tire molding mold has a pattern corresponding to the contour of a tire being molded, consisting of a tread portion 1 corresponding to the tread of the tire being molded and projections 2, or ribs and/or lugs, corresponding to recesses on the tire tread, as shown in FIG. 1. As is well known, the maneuverability, travelling, road holding, noise reduction and other performance of a tire are determined by the pattern and dimensional accuracy of the tread portion 1 and the projections 2.

Heretofore, the tire molding mold has been manufactured by integrally molding the tread portion 1 and the projections 2, or welding the projections 2 in advance onto the inner circumferential surface of a mold constituting the tread portion 1, using the plaster molding, sand casting, ceramic casting, metal mold casting or other precision casting process, the engraving process, or the electrical discharge machining process. These conventional manufacturing methods necessitate the replacement of the entire metal mold each time the tire tread pattern is changed to improve the aforementioned ioned tire performance. Furthermore, vent holes and other venting means have to be provided by machining the mold separately. With the conventional methods, it was impossible to manufacture a tire molding mold with as high concentricity and roundness accuracies as within 0.1 mm. In addition, the finish machining of metal molds involves an enormous amount of man-hours, leading to increased manufacturing costs and long manufacturing time.

A method has also been proposed in which the projections 2 are formed as individual pieces, which are inserted into grooves on the tread portion 1. In this case, however, rubber tends to enter into gaps between the grooves and the pieces during tire molding operation, causing unwanted projections (burrs) on the tire tread surface.

SUMMARY OF THE INVENTION

It is an object of this invention to provide a tire molding mold comprising a mold body having an inner circumferential surface corresponding to the tread of a tire being molded, and a mold attachment for molding recesses of the tire; the mold attachment being adapted to be detachably fitted to the mold body so as to permit the mold attachment to be replaced when the need for changing the tire tread pattern or for replacing worn-out mold attachment arises.

It is another object of this invention to provide a tire molding mold which permits manufacturing time and cost to be reduced.

It is a further object of this invention to provide a tire molding mold in which unwanted burrs are prevented from forming on the tire molded due to the existence of conventional vent holes by providing minute venting gaps at the joint portion between the mold attachment and the mold body to allow the gas generated during tire molding to be released.

BRIEF DESCRIPTION OF THE DRAWINGS

FIGS. 2 (A) through (E) are diagrams of assistance in explaining an embodiment of this invention; FIG. 2 (A) being a developed plan view of a mold surface; FIG. 2 (B) being a sectional side elevation taken along line A—A' in FIG. 2 (A); FIG. 2 (C) being a perspective view of a part of the mold attachment (consisting of ribs and lugs) shown in FIGS. 2 (A) and (B); FIG. 2 (D) being a sectional side elevation taken along line B—B' in FIG. 2 (A); and FIG. 2 (E) being a diagram of assistance in explaining the state of gas venting in the embodiment shown in FIG. 2.

FIGS. 3 (A) through (D) are diagrams of assistance in explaining another embodiment of this invention; FIG. 3 (A) being a developed plan view; FIG. 3 (B) being a sectional side elevation taken along line A—A' in FIG. 3 (A); and FIGS. 3 (C) and (D) being sectional side elevations taken along line B—B' in FIG. 3 (A).

DETAILED DESCRIPTION OF THE INVENTION

A tire molding mold embodying this invention and the manufacturing method thereof will be described in the following, referring to FIGS. 2 (A) through (E). In the figures, reference numerals 2-1 through 2-3 refer to ribs; 3, 3, . . . to lugs (ribs and lugs constitute the mold attachment of this invention, corresponding to the projections 2 shown in FIG. 1); 4 to mold body; 5 to an inner circumferential surface of the mold body 4, constituting the tread portion 1 shown in FIG. 1; 6 to a joint surface of the ribs 2-1 through 2-3 and the lugs 3, formed by a curved surface corresponding to the inner circumferential surface 5; 7 to a mounting bolt; 8 to a hole through which the mounting bolt 7 is passed; 9 to a venting slit; and 10 to grooves, respectively.

The tire molding mold of this invention, shown in FIG. 2, consists of the mold body 4 and the ribs 2-1 through 2-3 and the lugs 3, 3, . . . , integrally formed into a latticework, as shown in FIGS. 2 (A), (B) and (C). The mold body 4 is made of iron or aluminum, the inner circumferential surface thereof being machined into a curved surface corresponding to the tread of a tire being molded. The ribs 2-1 through 2-3 and the lugs 3, 3, . . . are made mainly of iron or aluminum, as in the case of the mold body 4, and manufactured with the lost wax, ceramic mold, plaster mold or other precision casting process so as to have a shape corresponding to a latticework of recesses of the tire being molded and the joint surface 6 corresponding to the inner circumferential surface 5 of the mold body 4. A perspective view of the ribs 2-1 through 2-3 formed integrally into a latticework is shown in FIG. 2 (C) to facilitate the understanding of the construction thereof. The ribs 2-1 through 2-3 and the lugs 3, 3, . . . may be manufactured by dividing into a appropriate number of segments at bold solid lines shown in FIG. 2 (A).

Figure 2A:
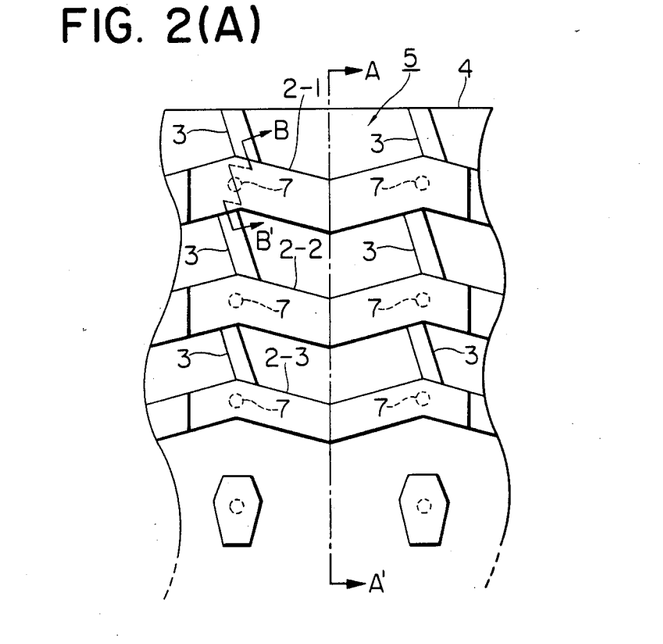
Figure 2B:
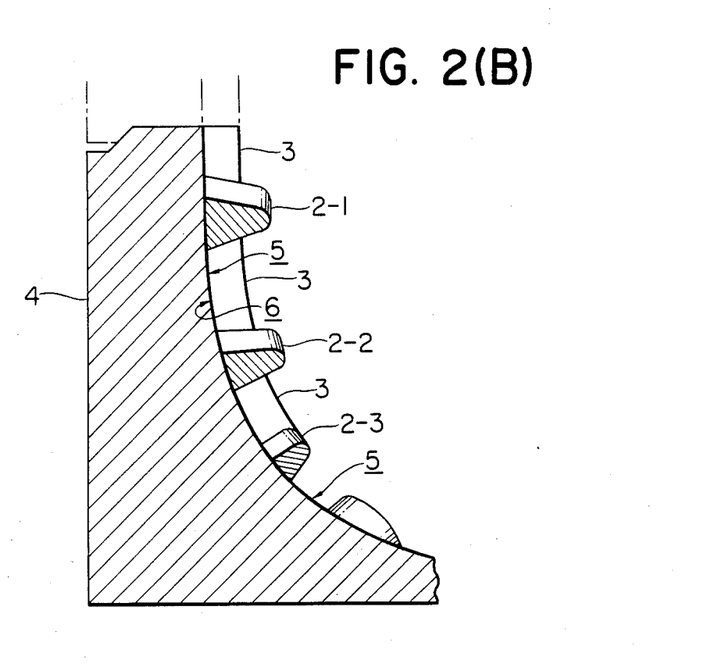
Figure 2C:
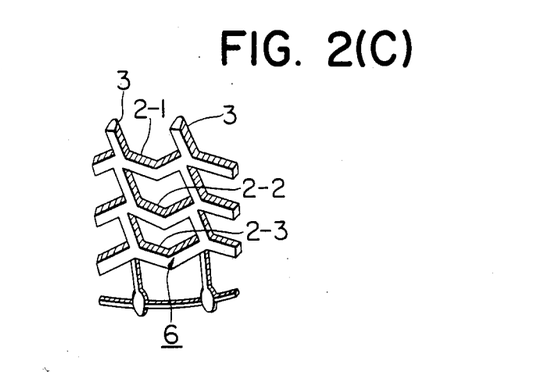
Figure 2D:
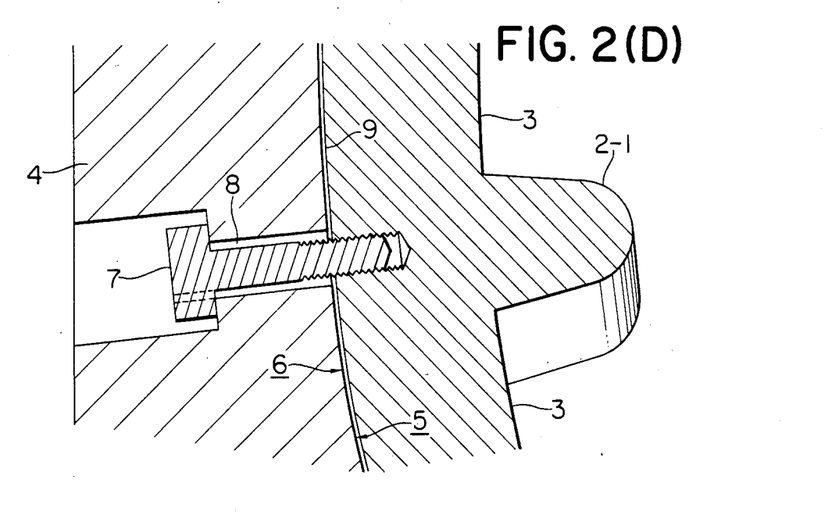

Next, an example of the method of mounting the ribs 2-1 through 2-3 and the lugs 3, 3, . . . , both of which are integrally formed into a latticework as described above, will be described with reference to FIG. 2 (D). The embodiment shown in FIG. 2 (D) is concerned with a method using the mounting bolt 7 for mounting the latticework of the ribs 2-1 through 2-3 and the lugs 3, 3, . . . on the mold body 4. That is, the latticework of the ribs 2-1 through 2-3 and the lugs 3, 3, . . . is disposed at a predetermined location on the inner circumferential surface 5 of the mold body 4, and fixed with the mounting bolt 7, as shown in FIG. 2 (D). As shown in FIG. 2 (A), the latticework of the ribs 2-1 through 2-3 and the lugs 3, 3, . . . is mounted on the inner circumferential surface 5 with a plurality of the mounting bolts 7 at appropriate locations. With this arrangement, the latticework of the ribs 2-1 through 2-3 and the lugs 3, 3, . . . can be easily detached, permitting tire tread pattern to be easily changed merely by replacing the latticework of the ribs 2-1 through 2-3 and the lugs 3, 3, . . . with a new one. Although the embodiment shown in FIG. 2 uses the mounting bolts 7 for mounting the ribs 2-1 through 2-3 and the lugs 3, 3, . . . , tapered pins (not shown) may be used. Even when the tapered pins are used in place of the mounting bolts 7, the latticework of the ribs 2-1 through 2-3 and the lugs 3, 3, . . . is made detachable. In addition to the aforementioned mounting methods using mounting bolts and tapered pins, an adhesive may be used to fix the latticework of the ribs 2-1 through 2-3 and the lugs 3, 3, . . . to the inner circumferential surface 5 of the mold body 4.

Figure 2E:
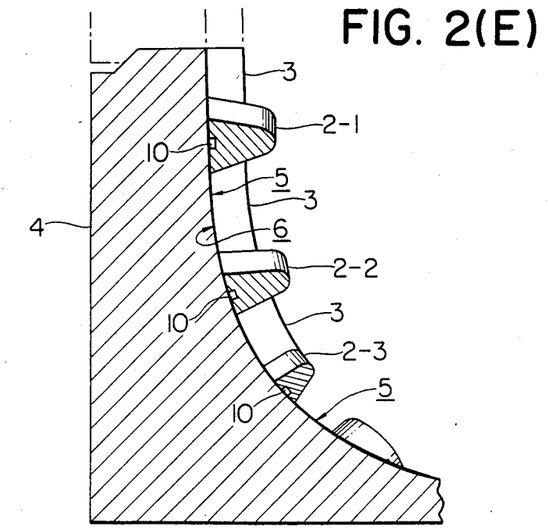

Next, the gas venting arrangement in the tire molding mold of this invention will be described. In manufacturing ribs and lugs integrally in this invention, the joint or mating surface 6 is finished with grinding, shot blasting, or knurling so that the surface roughness of the joint surface 6 becomes approx. 20 to 80 microns. As a result, venting gaps are formed at the joint or mating portion between the ribs and lugs and the mold body so as to allow the gas evolved during tire molding to be released to the outside through the abovementioned venting gaps and the holes 8 (as shown in FIG. 2 (D)) for passing through the mounting bolts 7. In this case, the gas evolved in the spaces defined by the ribs and the lugs may reach the adjoining spaces thereof through the joint or mating surfaces of the ribs and the lugs, being discharged through appropriate vent holes. Venting slits 6 leading to the holes 8 may be provided separately on the joint or mating surface, as shown in FIG. 2 (D). Furthermore, grooves 10 may be provided on the joint or mating surface along the centerlines of the ribs and lugs, as shown in the embodiment of FIG. 2 (E). Moreover, the gas venting effect may be enhanced by providing vent holes (not shown) leading to the joint or mating surface 6 in such a manner as to pass through the mold body 4, in addition to the holes 8. Since the venting gaps formed in this way are fine ones, unwanted burrs are never formed on the tread of the tire being molded.

Next, another embodiment of this invention will be described, referring to FIGS. 3 (A) through (D). In the figure, reference numerals 2-1 through 2-3, 4, and 6 through 10 correspond to like parts in FIG. 2. Reference numerals 11-1 through 11-3 refer to joint surfaces with the ribs 2-1 through 2-3 formed as a curved surface corresponding to the inner circumferential surface 5 at the locations of the ribs 2-1 through 2-3; 12-1 through 12-3 to projections; 13-1 through 13-3 to mating grooves provided on the inner circumferential surface 5 of the mold body 4 so as to accommodate the projections 12-1 through 12-3, respectively. It should be noted that the embodiment shown in FIG. 3 is concerned with a mold attachment consisting of ribs alone.

The embodiment shown in FIG. 3 comprises the mold body 4 and the ribs 2-1 through 2-3, which are detachably fitted onto the inner circumferential surface 5 of the mold body 4 with mounting means (as shown in FIGS. 3 (C) and (D)), which will be described later, for example, by inserting the projections 12-1 through 12-3 provided on the ribs 2-1 through 2-3 into the mating grooves 13-1 through 13-3 on the inner circumferential surface 5. The mold body 4 is made mainly of iron or aluminum, as in the case of the embodiment shown in FIG. 2, the inner circumferential surface 5 thereof being machined so as to fit to a curved surface of the tire being molded, including the thread thereof. The ribs 2-1 through 2-3 are also made mainly of iron or aluminum, as in the case of the embodiment shown in FIG. 2, and manufactured with the lost wax, ceramic mold, plaster mold or other precision casting process into such a shape that corresponds to recesses on the tire being molded and has the joint surfaces 11-1 through 11-3 corresponding to the inner circumferential surface 5 at the locations of the ribs 2-1 through 2-3.

Figure 3A:
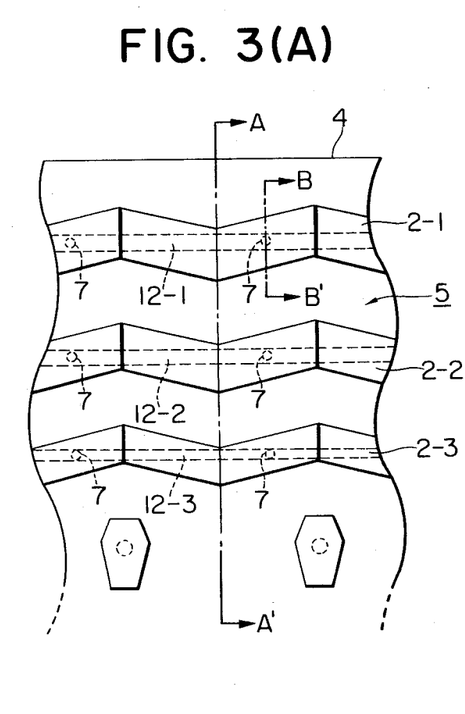
Figure 3B:
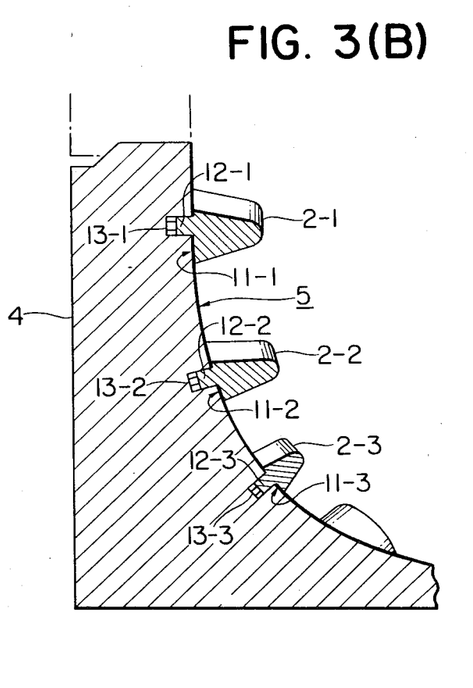
Figure 3C:
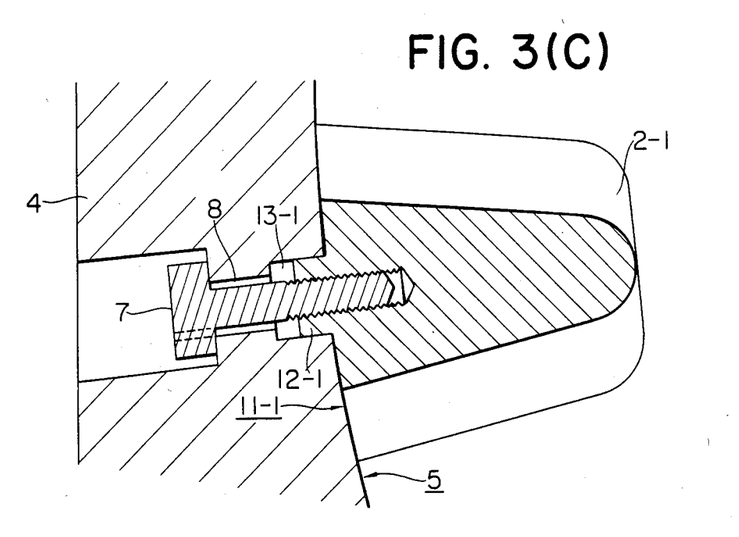
Figure 3D:
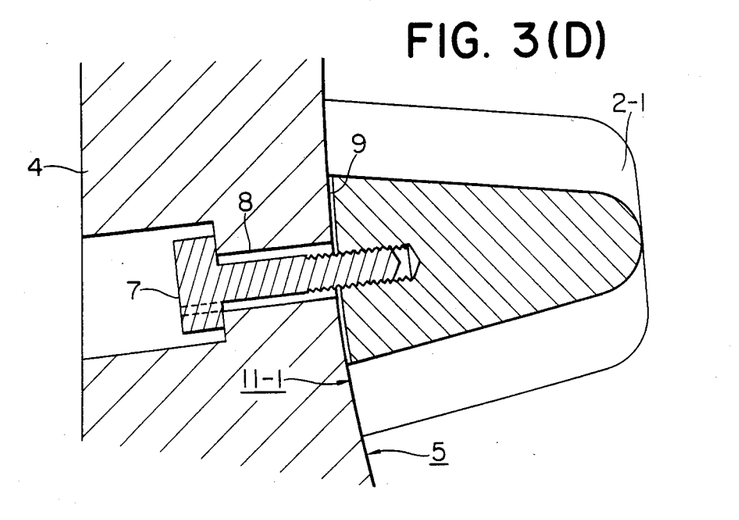

Next, an example of the mounting means of the ribs 2-1 through 2-3 of this invention will be described, referring to FIGS. 3 (C) and (D). FIGS. 3 (C) and (D) are enlarged cross sectional view taken along line B—B' in FIG. 3 (A).

In the embodiment shown in FIG. 3 (C), the projection 12-1 is provided on the joint surface 11-1 of the rib 2-1, and the mating groove 13-1 into which the projection 12-1 is inserted is provided on the inner circumferential surface 5 of the mold body 4. Consequently, the rib 2-1 is easily positioned since the rib 2-1 is fixedly fitted to the mold body 4 by inserting the projection 12-1 into the mating groove 13-1. In case the projection is not provided due to the geometry of the rib, the joint surface 11-1 may be adapted to be fitted along the entire inner circumferential surface 5 of the mold body 4. Although FIGS. 3 (C) and (D), which will be described later, show an embodiment in which the rib 2-1 is detachably fitted to the mold body 4 with the mounting bolt 7, a tapered pin (not shown) may be used to fixedly fit the rib 2-1. In this case, too, the rib 2-1 may be made detachable.

FIG. 3 (D) shows an embodiment where the rib 2-1 is disposed at a predetermined location on the inner circumferential surface 5 of the mold body 4 and fixedly fitted by the use of the mounting bolt 7, as in the case of the mounting means of the ribs and lugs in the embodiment shown in FIG. 2.

Next, the gas venting arrangement in the embodiment shown in FIG. 3 will be described. The gas venting arrangement in this embodiment is similar to that in the embodiment shown in FIG. 2. That is, in manufacturing the ribs 2-1 through 2-3, the joint surfaces 11-1 through 11-3 and the side surfaces (the mating surfaces with the mating grooves 13-1 through 13-3) of the projections 12-1 through 12-3 are finished with grinding, shot blasting or knurling to a surface roughness of 20 to 80 microns. Where the projections are not provided due to the geometry of the ribs, the grooves 10 in the embodiment shown in FIG. 2, as described in reference to FIG. 2 (E), may be provided along the centerlines of the joint surfaces of the ribs. With this arrangement, venting gaps are formed at the joint portions between the ribs 2-1 through 2-3 and the inner circumferential surface 5 of the mold body 4 to allow the gas evolved during tire molding to be discharged to the outside through the venting gaps and the mating grooves 13-1 through 13-3, or through the grooves 10 and the holes 8 for passing through the mounting bolts 7. As the aforementioned venting gaps, gas venting slits 9 leading to the holes 8 may be additionally provided on the joint surface 11-1, as shown in FIG. 3 (D). Furthermore, venting holes (not shown) passing through the mold body 4 and leading to the joint surface 11-1 may be provided to form gas venting passages, together with the gas venting holes and the joint surface 11-1 (or gas venting slit 9). In such a case, the gas generated in the space between the ribs may pass the joint surface of a certain rib and reach to the space between the adjoining ribs, escaping to the outside through an appropriate gas venting passage.

Figure 4:
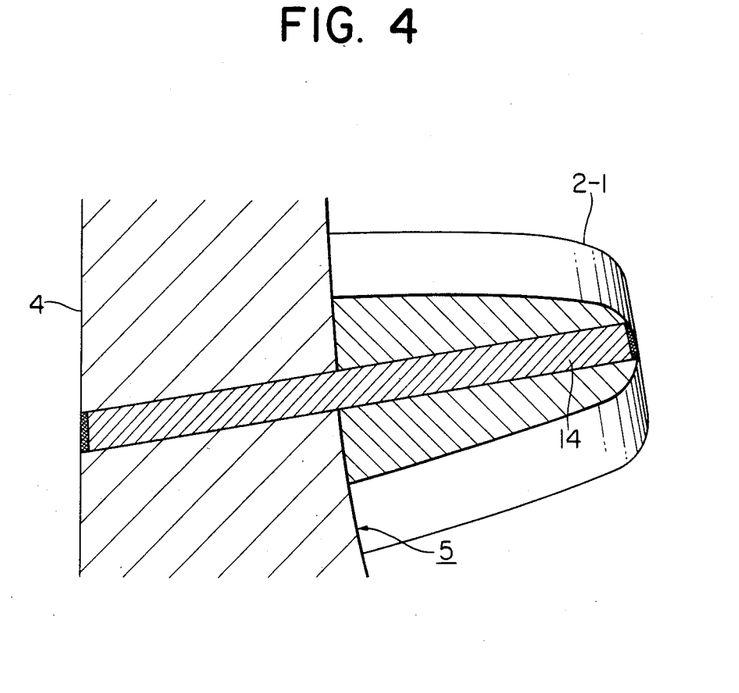
FIG. 4 is a diagram of assistance in explaining another example of the means for fitting the mold attachment according to this invention.

In the foregoing, a tire molding mold having a mold attachment which has no lugs, and the manufacturing method of the same have been described, referring to FIGS. 3 (A) through (D). The description of a tire molding mold having a mold attachment which has no ribs, and the manufacturing method of the same is the same as the aforementioned description of the embodiment shown in FIG. 3. Although description has been made in the foregoing on the mounting means of the mold attachment using bolts and tapered pins, another arrangement may be employed where a straight pin 14 is passed through the mold body 4 and the mold attachment (the rib 2-1 in the embodiment shown in FIG. 4) and both ends thereof are welded, as shown in FIG. 4. In this invention, the mold attachment is made detachable without damage to the joint surface and the adjoining portions between the inner circumferential surface 5 of the mold body 4 and the mold attachment even when any of the abovementioned mounting means (bolts, tapered pins or straight pins) is used.

In the foregoing, a tire molding mold of this invention and the manufacturing method of the same have been described. In the embodiments shown in FIGS. 2 and 3, the mold attachment (ribs and/or lugs) which has been finish machined in advance is used. This invention, however, is not limited to such a premachined mold attachment, but a blank of the mold attachment having machining allowances (not shown) may be mounted on the mold body 4 and finished into a predetermined profile with electrical discharge machining, NC machining and other machining means in subsequent stages. In such a case, it is needless to say that the joint surface of the blank of the mold attachment with the mold body 4 is machined in advance to conform to the inner circumferential surface 5 at the location to be disposed, and joined to the inner circumferential surface 5 with appropriate venting gaps. Furthermore, the mold attachment may be divided into a plurality of segments (at bold solid lines shown in FIG. 2 (B)).

As described above, this invention makes it possible to replace the mold attachment alone with the mold body being left as it is when changing tire tread pattern, for example, since the mold attachment is detachably fitted to the mold body, thus substantially reducing the manufacturing cost and time of tire molding molds. Provision of gas venting holes can prevent the formation of unwanted burrs on the tire molded, eliminating deburring operation and resulting in improved external appearance of the tire molded.

What is claimed is:

1. A tire molding mold comprising a mold body having an inner circumferential surface corresponding to the contour of a tire to be molded, including at least the tread thereof, and mold attachments each having a surface mating with said inner circumferential surface and for forming recesses of the tire to be molded, and characterized in that each mold attachment is made of a metal block and is joined and mated with said inner circumferential surface of said mold body and detachably fitted to said mold body, and wherein venting gaps are provided on said surface of said mold attachments which mates with said circumferential surface so as to be in the mating surface of and underlie said mold attachments, said mold attachments having outer surfaces which include no portion of said inner circumferential surface of said mold body and no portion of said contour of said tire to be molded.

2. A tire molding mold as set forth in claim 1, wherein said mold body has a plurality of holes which pass therethrough between the inner circumferential surface and a rear of said mold body, and said plurality of holes being covered by said mold attachments.

3. A tire molding mold as set forth in claim 2, wherein said mold body has a plurality of mating grooves which are connected with at least one of said holes.

4. A tire molding mold as set forth in claim 2, wherein each mold attachment has a groove provided on its mating surface along a center-line thereof which is connected with at least one of said holes.

5. A tire molding mold as set forth in claim 2, wherein each mold attachment is held by holding bolt means extending through one of said holes.

6. A tire molding mold as set forth in claim 2, wherein said mating surface of said attachments have a surface roughness of approximately 20 to 80 microns, said surface roughness forming said venting gaps.

7. A tire molding mold as set forth in claim 5, wherein said mating surface of said attachments have a surface roughness of approximately 20 to 80 microns, said surface roughness forming said venting gaps.

8. A tire molding mold as set forth in claim 7, wherein said mold body has a plurality of mating grooves which are connected with at least one of said holes.

9. A tire molding mold as set forth in claim 7, wherein each mold attachment has a groove provided on its mating surface along a center-line thereof which is connected with at least one of said holes.

10. A mold for molding a tire having an outer contour with recesses that define treads, the mold comprising a mold body having an inner circumferential surface corresponding to the outer contour, and a plurality of mold attachments detachably attached to the mold body and on the inner circumference, said mold attachments being shaped to form the recesses of the tire, each mold attachment having a mating surface corresponding to the inner circumferential surface of the mold body and engaged against the inner circumferential surface of the mold body, each mold attachment having at least one venting gap defined in its mating surface so as to be in the mating surface of and underlie said mold attachment, said mold body having at least one opening for each mold attachment, each mold body opening extending into said inner circumferential surface of said mold body and communicating with the venting gaps of said mold attachments, said venting gaps lying in a plane of said inner circumferential surface and said mating surface for its respective mold attachment, and a connecting member extending through each mold body opening and connected to each mold attachment respectively for connecting said mold body to each mold attachment, each mold attachment being smaller than its respective mold body opening for permitting communication from said venting gaps to said mold body openings.

* * * * *